United States Patent Office 3,206,375
Patented Sept. 14, 1965

3,206,375
METHOD FOR PREPARING 5-KETOFRUCTOSE BY FERMENTATION
Shukuo Kinoshita and Osamu Terada, Tokyo, Japan, assignors to Kyowa Hakko Kogyo Co., Ltd., Tokyo, Japan, a corporation of Japan
No Drawing. Filed Oct. 11, 1963, Ser. No. 315,694
Claims priority, application Japan, May 13, 1960, 35/23,944
20 Claims. (Cl. 195—31)

The application is a continuation-in-part of copending application Serial No. 109,520, filed May 12, 1961 (now abandoned), entitled Method for Preparing 5-Ketofructose by Fermentation.

The present invention relates to method of preparing 5-ketofructose (5-dehydrofructose). More specifically it relates to a method of producing 5-ketofructose by culturing a strain of a 5-ketofructose-producing microorganism in a fructose-containing medium to produce thereby the desired 5-ketofructose, which is then isolated from the medium.

Kojic acid, isokojic acid and glucosan are known as oxidation products of fructose derived from Acetobacter, but the present 5-ketofructose has not been recognized as said oxidation product.

It is also known to produce fructose by the oxidative action of certain microorganisms on mannitol. For example, the NRRL–B72 strain of *Acetobacter suboxydans* will, by oxidative action in a fermentation medium, convert mannitol to fructose.

It has not been known, however, prior to the present invention, that by the use of such microorganisms which can convert mannitol to fructose the oxidation of mannitol may be continued through the production of fructose to 5-ketofructose.

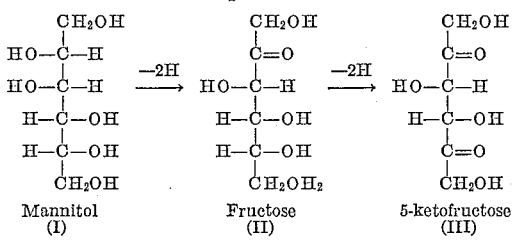

Equation 1

Referring to Equation 1, it is known that a number of species of Acetobacter will effect the oxidative step from mannitol to fructose (I→II). About 8 hours are enough for the oxidative step. Further oxidation has not been tried or thought of. In fact, most of the strains which have been used to effect this conversion fail to carry out the further oxidative step to produce 5-ketofructose, even if they are cultured for a period of time longer than 8 hours, e.g. a week. The present inventors have found that specific strains belonging to the Acetobacter species will effect not only the conversion from I→II but will also, by further oxidative action, convert fructose to 5-ketofructose thus completing the conversion from I→III.

It may thus be seen that the culture medium used is one which contains fructose. The fermentation may be initiated with fructose present or the fructose may be formed in situ by the oxidative action on mannitol as in I→II in Equation 1.

The mannitol or fructose present in the medium may be obtained through the addition of these compounds per se or it may be through the addition of a material containing one of these compounds.

The strains of microorganisms useful in the present invention are those strains belonging to species *Acetobacter suboxydans*, *Acetobacter melanogenus*, *Acetobacter roseus* and *Acetobacter oxydans*. See Bergey's Manual, 7th edition, pages 184–189.

The culture media usable in the method of the present invention contain fructose, mannitol or a material containing either of these as mentioned previously. It is preferable for the media to contain in addition a nitrogen source, inorganic salts and other growth promoting agents sufficient to satisfy the growth requirements of the strain used. However, such additional substances are not always necessary, particularly when a crude fructose solution from Jerusalem Artichoke, for example, is used as the media. Either liquid or solid culture media may be used. It is possible to shorten the fermentation period with liquid media by supplying oxygen with aeration.

The concentration of fructose and mannitol is not critical; however, to obtain the most favorable yields it is present in a concentration of 5 to 10% (weight per volume).

Culture temperatures of 10° to 40° C. may be used. It is preferred that temperatures in the range of 25° to 30° C. be used. The temperature used, however, effects only the culturing time which is required.

The pH range of the culture medium is preferably 3 to 8, most preferably about 6. No further control is needed during the fermentation.

As previously stated, the microorganism is cultured in a culture medium containing fructose. Following the termination of the fermentation, bacterial cells and other solids are removed by extraction with a small amount of water in the case of solid culture media and by filtration or centrifugal precipitation in the case of liquid media. The resulting aqueous solution is decolorized with active carbon, deionized with ion exchange resins, such as Amberlite IR–120, a polystyrene resin nuclearly substituted with sulfonic acid groups, and IRA–400, manufactured by Rohm & Haas Co. and concentrated under reduced pressure at a temperature lower than 70° C. The resulting aqueous concentrate is further concentrated under reduced pressure with intermittent addition of alcohol so that the remaining water may be removed as an azeotropic mixture at a temperature below 50° C. During this process some amorphous precipitate is formed and is removed by filtration upon addition of ether to the filtrate, a large quantity of white precipitate is formed which is washed with alcohol, then with ether, and dried to obtain the crude 5-ketofructose. The crude product is recrystallized by further extraction and concentrate with a large amount of alcohol to obtain rod shaped crystalline powder.

The 5-ketofructose thus obtained is colorless, odorless, small rod-shaped crystal with a sweet taste and is not hygroscopic. The melting point is 162° C. (with decomposition). Said 5-ketofructose is easily soluble in water, glycerine, and glycol; slightly soluble in alcohol, and ethyl acetate; and substantially insoluble in ether. It has a strong reducing power and is capable of reducing Fehling's solution at room temperature. Its total reducing power is almost the same as that of glucose. It is stable to acid, heat, and light, but unstable to alkali. When a paper chromatogram is heated after having been sprayed with an alcoholic solution of anisidine hydrochloride, it presents a greenish brown color and is easily distinguished from ketose (yellow) and aldose (brown).

The 5-ketofructose has strong microbiocidal activity owing to presence of enol-type OH and fairly strong reducing activity owing to its diketo type construction. Accordingly, it will be useful for microbicides and mild reducing agents. It will also be expected to be intermediates for synthesizing some other substances.

The following examples are to illustrate the invention and should not be construed as limitative thereof:

Example I

*Acetobacter roseus* ATCC 15178 is inoculated in 1 liter of culture medium (pH 6.0) containing 10% fructose and 0.5% yeast extract and cultured under aeration for about 4 days at 28° C. After a substantial proportion of the fructose is oxidized to 5-ketofructose, the culture broth is centrifuged to remove solid matter. The resulting supernatant solution is decolorized with active carbon, deionized with Amberlite IR–120 and IRA–400, polystyrene resin nuclearly substituted with quarternary ammonium salt groups, and concentrated under reduced pressure at a temperature below 70° C. The aqueous concentrate thus obtained is further concentrated under reduced pressure with the intermittent addition of alcohol, whereby the remaining moisture is removed as an azeotropic mixture. Amorphous precipitate which forms during this process is removed by filtration. By further concentration, crystals of 5-ketofructose are formed. The concentrate is left in an ice box for a night to complete crystallization. The resulting crystalline precipitate is filtered, washed with chilled alcohol, then with ether, and dried to obtain 5 gm. of 5-ketofructose crystals. The filtrate and washings are combined, and to this is added 1 to 2 volumes of ether. A large amount of white amorphous precipitate is thus formed, from which about 10 gm. of crystalline 5-ketofructose is recovered by recrystallization from alcohol.

Example 2

*Acetobacter suboxydans* ATCC 621 is used in place of *A. roseus* ATCC No. 15178 in Example 1, and about 13 gm. of 5-ketofructose in crystalline form is obtained by the same process of culturing and recovering as in Example 1.

Examples 3–9

The following strains are used in place of *A. roseus* ATCC No. 15178 in Example 1. Yields of 5-ketofructose in crystalline form are shown in the following table.

|  | Gm. |
|---|---|
| *A. suboxydans* IFO 3256 | 14 |
| *A. melanogenus* IAM 1819 | 16 |
| *A. melanogenus* IAM 1820 | 15 |
| *A. oxydans* IAM 1823 | 12 |
| *A. oxydans* IFO 3189 | 14 |
| *A. roseus* ATCC No. 15179 | 15 |
| *A. roseus* ATCC No. 15180 | 13 |

It is thought that the invention and its advantages will be understood from the foregoing description and it is apparent that various changes may be made in the process, without departing from the spirit and scope of the invention or sacrificing its material advantages, the process hereinbefore described being merely illustrative of preferred embodiments of the invention.

What is claimed is:

1. A process for preparing 5-ketofructose which comprises culturing a 5-ketofructose producing strain of microorganism selected from the species consisting of *Acetobacter suboxydans*, *Acetobacter melanogenus*, *Acetobacter roseus* and *Acetobacter oxydans* in a fructose-containing culture medium, accumulating 5-ketofructose in the medium and removing the 5-ketofructose thus accumulated.

2. A process for preparing 5-ketofructose which comprises culturing at a temperature of from 10° to 40° C. and at a pH of 3 to 8, a 5-ketofructose producing strain of microorganism selected from the species consisting of *Acetobacter suboxydans*, *Acetobacter melanogenus*, *Acetobacter roseus* and *Acetobacter oxydans* in a fructose containing culture medium accumulating 5-ketofructose in the medium, and removing the 5-ketofructose thus accumulated.

3. A process for preparing 5-ketofructose which comprises (a) culturing a 5-ketofructose producing strain of microorganism selected from the species consisting of *Acetobacter suboxydans*, *Acetobacter melanogenus*, *Acetobacter roseus* and *Acetobacter oxydans* in a culture medium containing 5 to 10% (weight per volume) of mannitol for a time sufficient to convert the mannitol to fructose; (b) continuing the culturing for a time sufficient to convert the fructose to 5-ketofructose, and (c) removing the 5-ketofructose.

4. A process for preparing 5-ketofructose which comprises (a) culturing at a temperature of from 10° to 40° C. and a pH of from 3 to 8 a 5-ketofructose producing strain of microorganism selected from the species consisting of *Acetobacter suboxydans*, *Acetobacter melanogenus*, *Acetobacter roseus* and *Acetobacter oxydans* in a culture medium containing 5 to 10% (weight per volume) of mannitol for a time sufficient to convert the mannitol to fructose; (b) continuing the culturing for a time sufficient to convert the fructose to 5-ketofructose; and (c) removing the 5-ketofructose thus accumulated.

5. A process for preparing 5-ketofructose which comprises culturing a 5-ketofructose producing strain of *Acetobacter roseus* in a fructose containing medium, accumulating 5-ketofructose in the medium and removing the 5-ketofructose thus accumulated.

6. A process for preparing 5-ketofructose which comprises culturing at a temperature of from 10 to 40° C. and at a pH of from 3 to 8 a 5-ketofructose producing strain of *Acetobacter roseus* in a fructose containing medium, accumulating 5-ketofructose in the medium and removing the 5-ketofructose thus accumulated.

7. A process for preparing 5-ketofructose which comprises aerobically culturing at a temperature of from 10° to 40° C. and at a pH of from 3 to 8 *Acetobacter roseus* (ATCC 15178) in a fructose containing medium, accumulating 5-ketofructose in the medium and removing the 5-ketofructose thus accumulated.

8. A process for preparing 5-ketofructose which comprises (a) culturing a 5-ketofructose producing strain of *Acetobacter roseus* in a culture medium containing 5 to 10% (weight per volume) of mannitol for a time sufficient to convert the mannitol to fructose; (b) continuing the culturing for a time sufficient to convert the fructose to 5-ketofructose, and; (c) removing the 5-ketofructose thus accumulated.

9. A process for preparing 5-ketofructose which comprises (a) culturing at a temperature of from 10° to 40° C. and at a pH of from 3 to 8 a 5-ketofructose producing strain of *Acetobacter roseus* in a culture medium containing 5 to 10% (weight per volume) of mannitol for a time sufficient to convert the mannitol to fructose; (b) continuing the culturing for a time sufficient to convert the fructose to 5-ketofructose, and; (c) removing the 5-ketofructose thus accumulated.

10. A process which comprises culturing at a temperature of about 25° to 30° C. and at a pH of about 7 *Acetobacter roseus* (ATCC 15178) in a culture medium containing 5 to 10% (weight per volume) of fructose, accumulating 5-ketofructose in the medium, and removing the 5-ketofructose thus accumulated.

11. A process which comprises culturing at a temperature of about 25° to 30° C. and at a pH of about 7 a 5-ketofructose producing strain of *Acetobacter suboxydans* in a culture medium containing 5 to 10% (weight per volume) of fructose, accumulating 5-ketofructose in the medium, and removing the 5-ketofructose thus accumulated.

12. In the process of producing 5-ketofructose by the oxidation of fructose, the improvement wherein the oxidation is effected microbiologically by culturing a 5-ketofructose producing strain of microorganism selected from the species consisting of *Acetobacter suboxydans*, *Acetobacter melanogenus*, *Acetobacter roseus* and *Acetobacter oxydans* in a fructose containing medium.

13. In the process of producing 5-ketofructose by the oxidation of fructose, the improvement wherein the oxidation is effected microbiologically by culturing at a temperature of from 10° to 40° C. and at a pH of from 3 to 8 a 5-ketofructose producing strain of microorganism selected from the species consisting of *Acetobacter suboxydans, Acetobacter melanogenus, Acetobacter roseus* and *Acetobacter oxydans* in a fructose containing medium.

14. In the process of producing 5-ketofructose by the oxidation of fructose the improvement wherein the oxidation is effected microbiologically by (a) culturing a 5-ketofructose producing strain of microorganism selected from the species consisting of *Acetobacter suboxydans, Acetobacter melanogenus, Acetobacter roseus* and *Acetobacter oxydans* in a mannitol containing medium for a time sufficient to convert the mannitol to fructose; (b) continuing the culturing for a time sufficient to convert the fructose to 5-ketofructose and; (c) removing the 5-ketofructose thus accumulated.

15. A process as in claim 13 wherein the culture medium contains 5 to 10% (weight per volume) of fructose.

16. In the process of producing 5-ketofructose by oxidation of fructose, the improvement wherein the oxidation is effected microbiologically by culturing a 5-ketofructose producing strain of *Acetobacter roseus* in a fructose containing medium.

17. In the process of producing 5-ketofructose by oxidation of fructose, the improvement wherein the oxidation is effected microbiologically by culturing a 5-ketofructose producing strain of *Acetobacter suboxydans* in a fructose containing culture medium.

18. In the process of producing 5-ketofructose by oxidation of fructose, the improvement wherein the oxidation is effected microbiologically by (a) culturing a 5-ketofructose producing strain of *Acetobacter suboxydans* in a mannitol containing medium for a time sufficient to convert the mannitol to fructose; (b) continuing the culturing for a time sufficient to convert the fructose to 5-ketofructose and; (c) removing the 5-ketofructose thus accumulated.

19. A process as in claim 16 wherein the culture medium contains 5 to 10% (weight per volume) of fructose.

20. In the process for producing 5-ketofructose by oxidation of fructose, the improvement wherein the oxidation is effected microbiologically by culturing at a temperature of about 25° to 30° C. and at a pH of about 7, a 5-ketofructose producing strain of *Acetobacter roseus* in a culture medium containing 5 to 10% (weight per volume) of fructose.

References Cited by the Examiner

UNITED STATES PATENTS 2,753,279   7/56   Cushing et al. _____ 195—11

OTHER REFERENCES

Chemical Abstract, vol. 48, page 13821a (1954).
Iowa State College, Journal of Science, vol. 13, pages 279–281 (1939).
J. Am Chem. Soc., vol. 58 pages 1012–1013 (1936).
Prescott et al.: Industrial Microbiology, 3rd edition, page 466 (1959).

A. LOUIS MONACELL, *Primary Examiner.*